United States Patent
Ho

(10) Patent No.: US 9,352,200 B1
(45) Date of Patent: May 31, 2016

(54) FRONT WHEEL FOLDING ARRANGEMENT FOR GOLF BAG CART

(71) Applicant: Dongguan Sunforce Plastics & Electrical Appliances Co., Ltd., Dongguan, Guangdong Province (CN)

(72) Inventor: Siu Fung Ho, Dongguan (CN)

(73) Assignee: Dongguan Sunforce Plastics & Electrical Appliances Co., Ltd., Dongguan, Guangdong Province (CN)

( * ) Notice: Subject to any disclaimer, the term of this patent is extended or adjusted under 35 U.S.C. 154(b) by 0 days.

(21) Appl. No.: 14/829,532

(22) Filed: Aug. 18, 2015

(30) Foreign Application Priority Data

Jan. 12, 2015 (CN) .................. 2015 2 0019289 U

(51) Int. Cl.
*B62B 5/04* (2006.01)
*B62B 7/06* (2006.01)
*B62B 7/04* (2006.01)

(52) U.S. Cl.
CPC .................. *A63B 55/60* (2015.10); *A63B 55/57* (2015.10); *B62B 5/0438* (2013.01); *B62B 7/044* (2013.01); *B62B 7/06* (2013.01)

(58) Field of Classification Search
CPC .................. B62B 5/0083; B62B 5/04; B62B 5/0438–5/0447; B62B 5/0466; B62B 5/0457–5/0461; B62B 7/044; B62B 7/06; B62B 7/10; A63B 55/00; A63B 55/60
See application file for complete search history.

(56) References Cited

U.S. PATENT DOCUMENTS

| | | | | |
|---|---|---|---|---|
| 5,590,896 A * | 1/1997 | Eichhorn | .................. | B62B 7/08 188/20 |
| 6,481,518 B1 * | 11/2002 | Wu | ....................... | B60K 7/0007 180/19.1 |
| 2004/0090043 A1 * | 5/2004 | Jane Santamaria | ....... | B62B 9/12 280/642 |
| 2006/0192366 A1 * | 8/2006 | Kimberley | ................ | B62B 3/12 280/651 |
| 2008/0251653 A1 * | 10/2008 | Manus | .................... | B62B 1/042 248/96 |
| 2015/0028568 A1 * | 1/2015 | Tran | .......................... | B62B 3/02 280/641 |
| 2015/0054239 A1 * | 2/2015 | Stewart | .................. | A63B 55/08 280/38 |

* cited by examiner

*Primary Examiner* — Jeffrey J Restifo
*Assistant Examiner* — Erez Gurari
(74) *Attorney, Agent, or Firm* — Tsz Lung Yeung

(57) ABSTRACT

A golf bag cart includes a main frame having a main supporting portion, a handle portion upwardly extended from the main supporting portion, and a handle unit provided on the handle portion, a front wheel operatively supported by the main frame, two rear wheels operatively supported by the main frame, and a wheel folding arrangement which includes a locking mechanism. The locking mechanism can be operated between a locking mode and an unlocking mode for locking and unlocking the front wheel.

11 Claims, 7 Drawing Sheets

FRONT WHEEL FOLDING ARRANGEMENT FOR GOLF BAG CART

BACKGROUND OF THE PRESENT INVENTION

1. Field of Invention

The present invention relates to a golf bag cart, and more particularly to a front wheel folding device for a golf bag cart.

2. Description of Related Arts

A majority of conventional golf bag cart does not usually have any adjustment devices for adjusting the direction of the golf bag cart when it is moving. For those which are equipped with folding mechanisms, the corresponding structures are usually very complicated and technically unreasonable. Moreover, conventional folding devices are very difficult or inconvenient to operate. All these factors lead to high manufacturing costs and complicated manufacturing procedures.

SUMMARY OF THE PRESENT INVENTION

Certain Variations of the present invention provide a golf bag cart which comprises a front wheel folding arrangement for allowing a user to conveniently fold and unfold at least one front wheel of the golf bag cart.

Certain Variations of the present invention provide a golf bag cart which comprises a locking mechanism for selectively and conveniently locking and unlocking a front wheel of the golf bag cart.

In one aspect of the present invention, it provides a golf bag cart, comprising:

a main frame having a main supporting portion, a handle portion upwardly extended from the main supporting portion, and a handle unit provided on the handle portion;

a front wheel operatively supported by the main frame;

two rear wheels operatively supported by the main frame; and a wheel folding arrangement which comprises a locking mechanism, the locking mechanism comprising a first connector connected to the front wheel, a second connector movably connected to the first connector via a bearing and a rotating axle, and a locking device provided on the first connector for selectively locking a relative movement between the first connector and the second connector, the locking device comprising a locking latch, and a resilient element provided on the locking latch and is normally compressed to exert a basing force against the locking latch, the locking mechanism being operated between a locking mode and an unlocking mode, wherein in the locking mode, the handle member of the handle unit is rotated such that the resilient element is released to bias against the locking latch so as to drive the locking latch to engage with the first connector for locking the front wheel, wherein in the unlocking mode, the handle member of the handle unit is rotated such that the locking latch is driven to disengage from the locking hole of the first connector while the resilient element is re-compressed so as to allow the front wheel to be freely rotatable.

DETAILED DESCRIPTION OF THE PREFERRED EMBODIMENT

Figure 1:
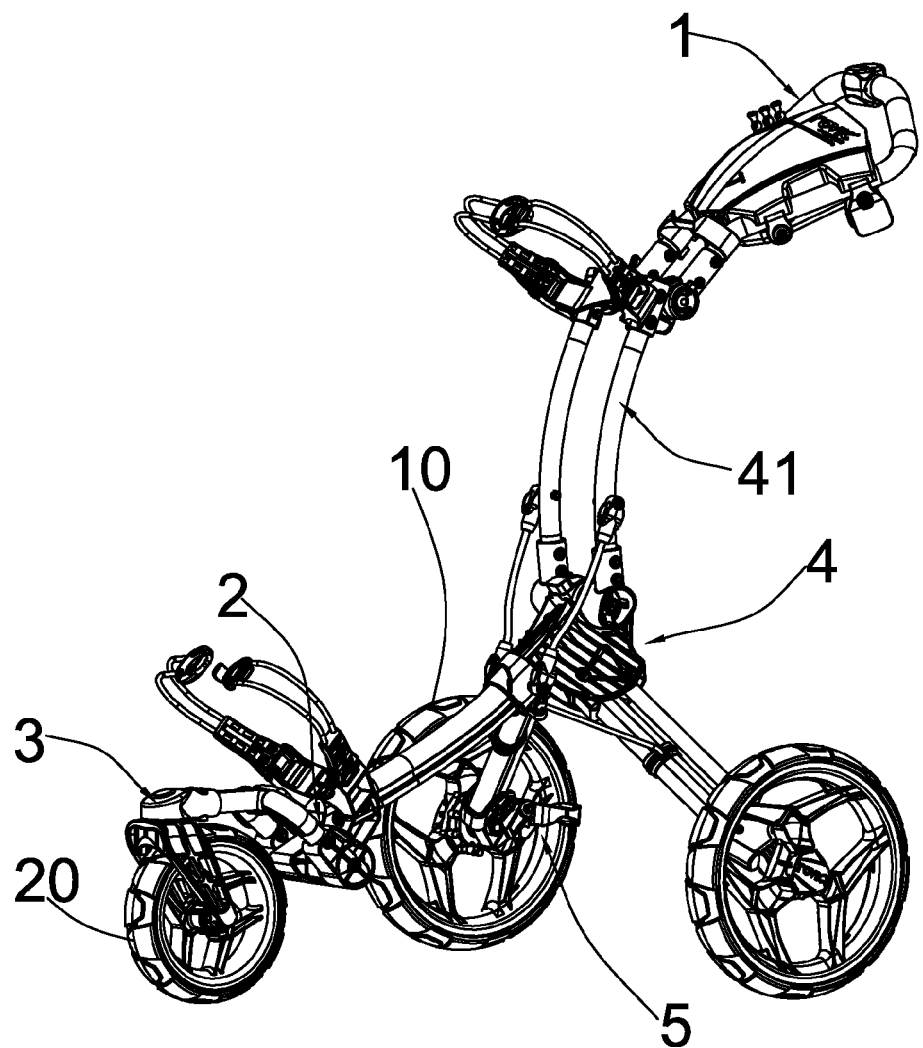
FIG. 1 is perspective view of a golf bag cart according to a preferred embodiment of the present invention, illustrating that a front wheel of the golf bag cart is locked.
Figure 2:
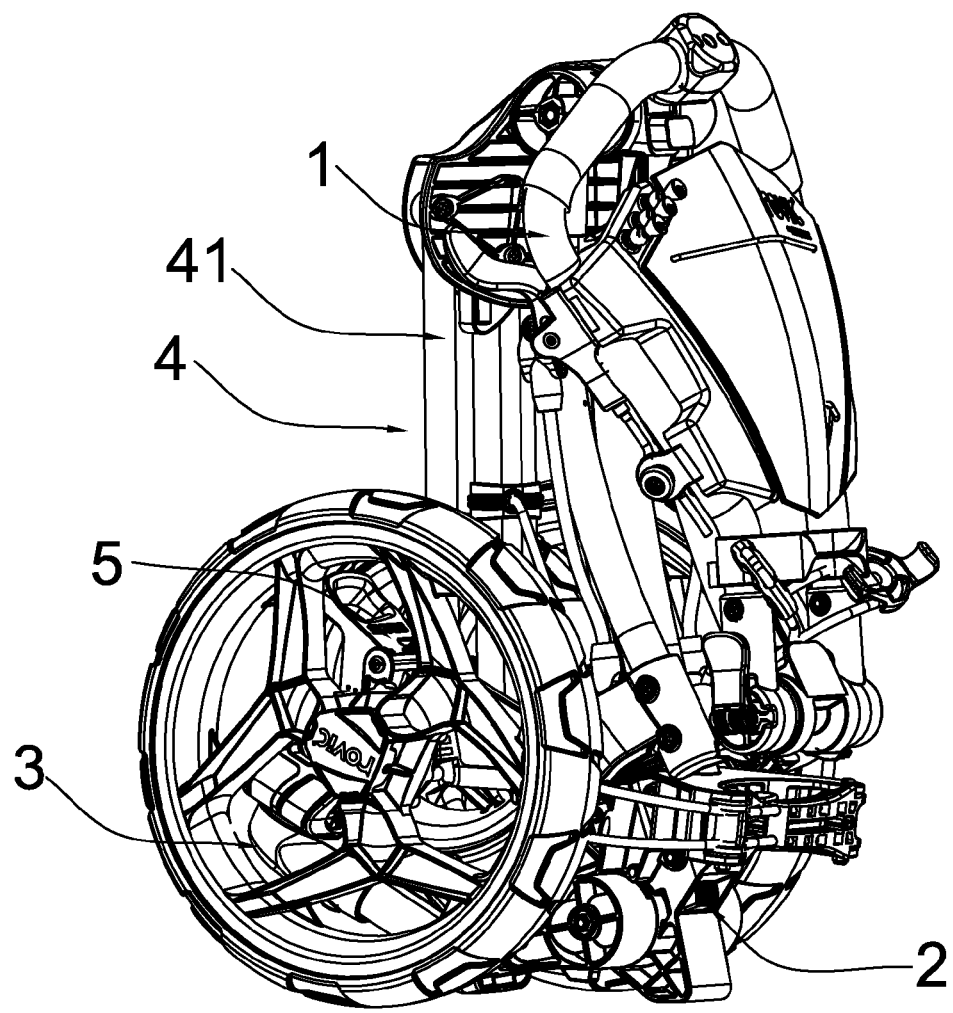
FIG. 2 is a perspective view of the golf bag cart according to the preferred embodiment of the present invention, illustrating that the front wheel is folded toward a main frame of the golf bag cart.
Figure 3:
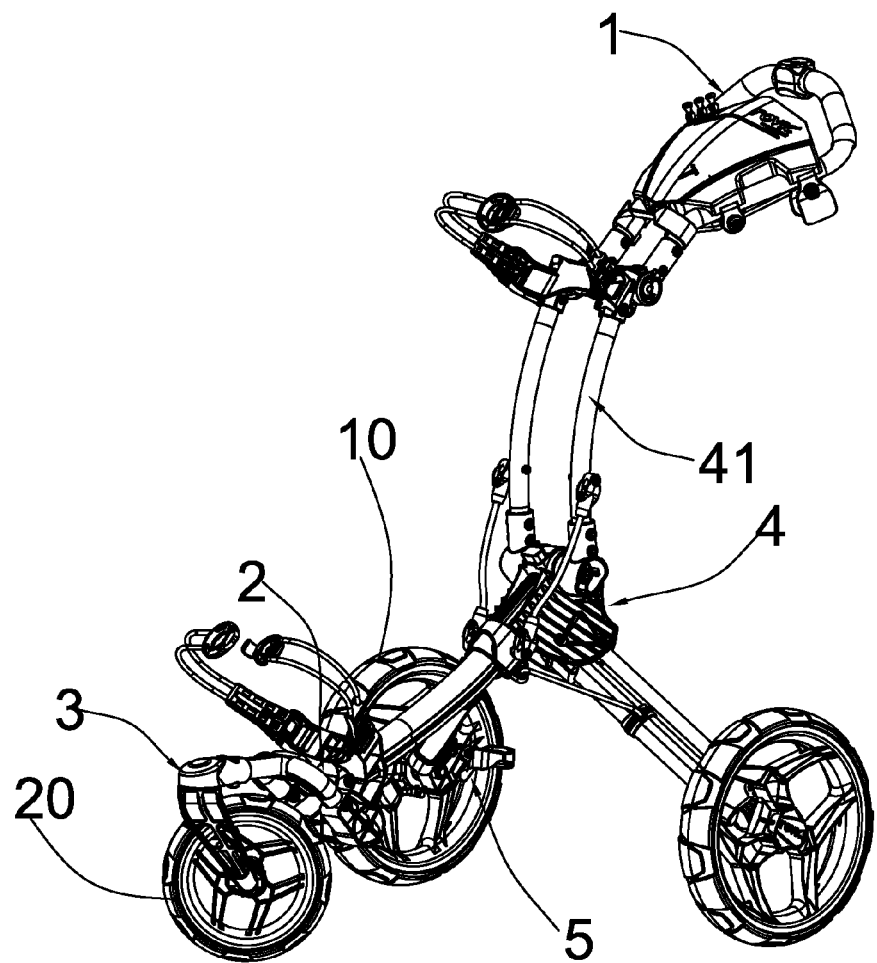
FIG. 3 is perspective view of the golf bag cart according to the preferred embodiment of the present invention, illustrating that the front wheel of the golf bag cart is unlocked.
Figure 4:
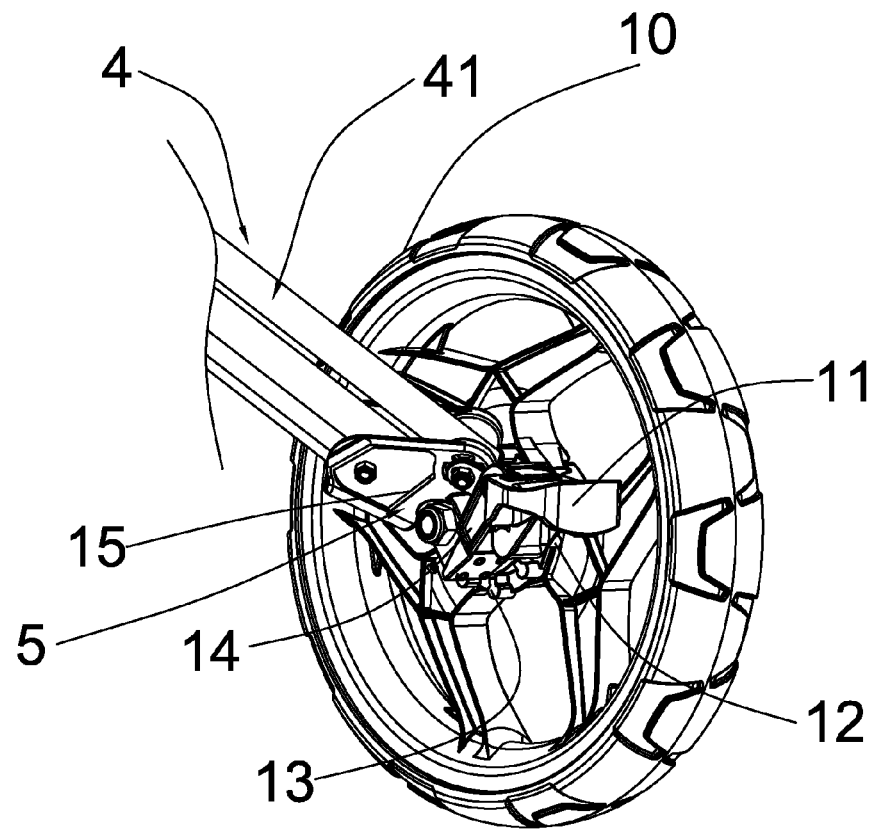
FIG. 4 a partial perspective view of the golf bag cart according to the preferred embodiment of the present invention, illustrating a rear wheel and a braking device of the golf bag cart.
Figure 5:
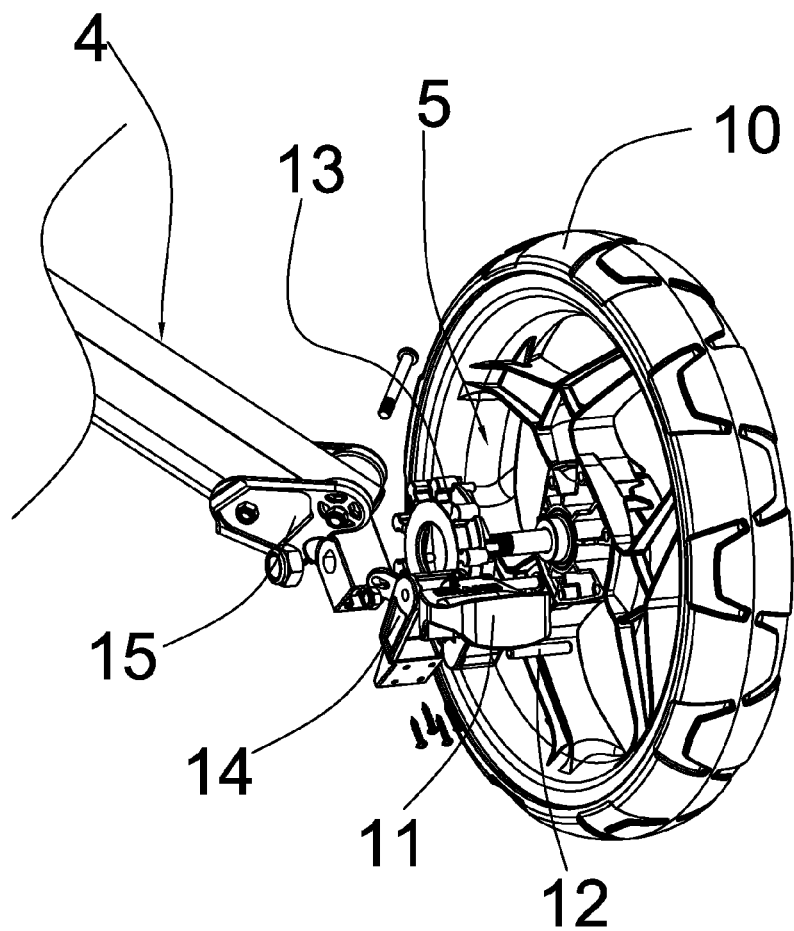
FIG. 5 is an exploded perspective view of the golf bag cart according to the preferred embodiment of the present invention, illustrating a rear wheel and a braking device of the golf bag cart.

The following detailed description of the preferred embodiment is the preferred mode of carrying out the invention. The description is not to be taken in any limiting sense. It is presented for the purpose of illustrating the general principles of the present invention. Each of the inventive features described below can be used independently of one another or in combination with other features.

Referring to FIG. 1 to FIG. 7 of the drawings, a golf bag cart according to a preferred embodiment of the present invention is illustrated. Broadly, the golf bag cart comprises two rear wheels 10, a front wheel 20, a main frame 4, a wheel folding arrangement connected to the main frame 4 and the front wheel 20, and a braking device 5 mounted on at least one of the rear wheels 10. The wheel folding arrangement comprises a locking mechanism 3 and a folding mechanism 2.

The locking mechanism 3 comprises a first connector 21 connected to the front wheel 20, a second connector 24 movably connected to the first connector 21 via a bearing 23 and a rotating axle 22, and a locking device 7 provided on the first connector 21 for selectively locking a relative movement between the first connector 21 and the second connector 24.

The main frame 4 has a main supporting portion 41, a handle portion 1 upwardly extended from the main supporting portion 41, and a handle unit 6 provided on the handle portion 1 for providing a handle for a user of the present invention.

The locking device 7 comprises a locking latch 25, a resilient element 26 provided on the locking latch 25 and is normally compressed to exert a basing force against the locking latch 25, a supporting base 27 connected to the locking latch 25 and supporting the resilient element 26, and a connecting wire 34 operatively connecting the locking latch 25 and the handle unit 6 of the main frame 4. In other words, the handle unit 6 is arranged to drive the locking latch 25 via the connecting wire 34 so as to facilitate locking and unlocking of the front wheel 20.

Figure 6:
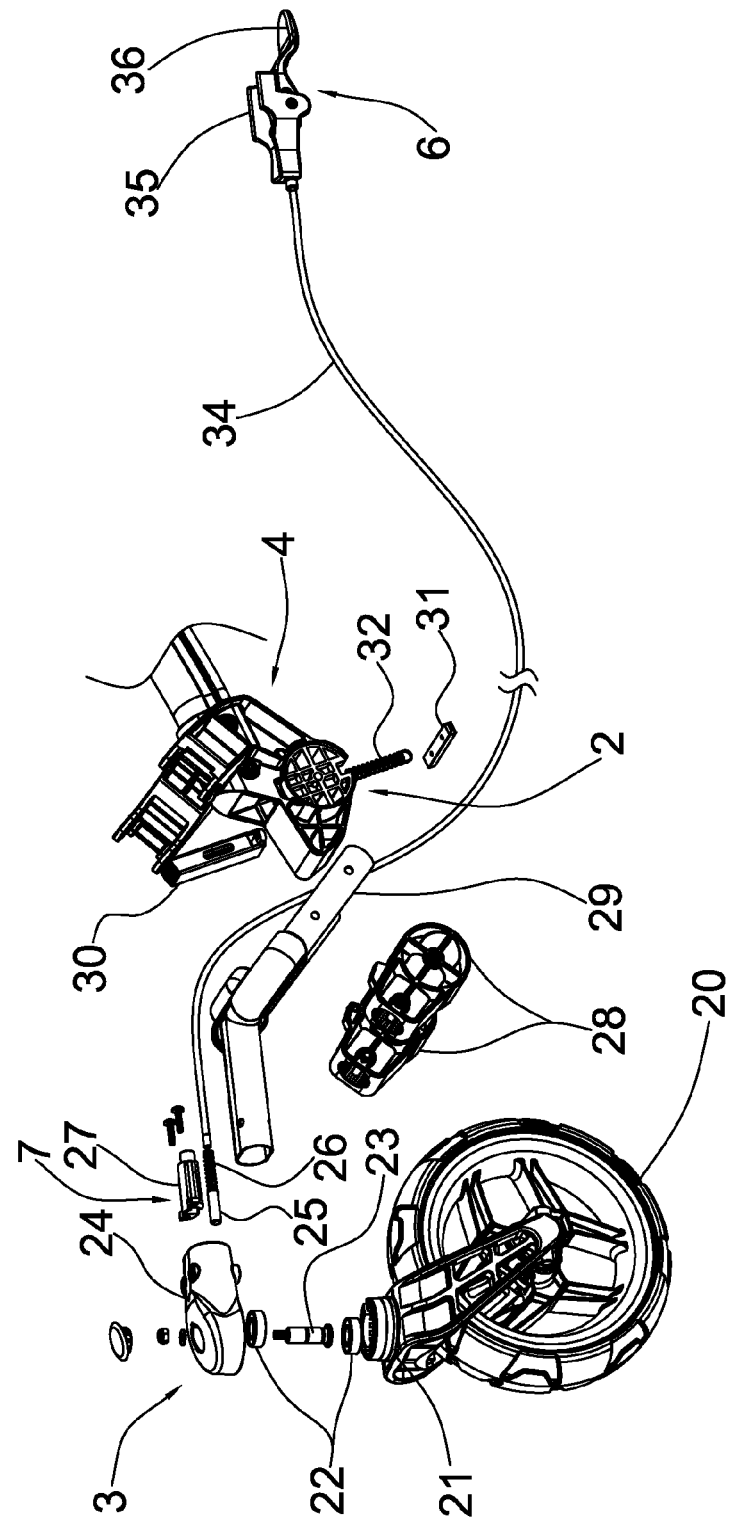
FIG. 6 is an exploded perspective view of the golf bag cart according to the preferred embodiment of the present invention.
Figure 7:
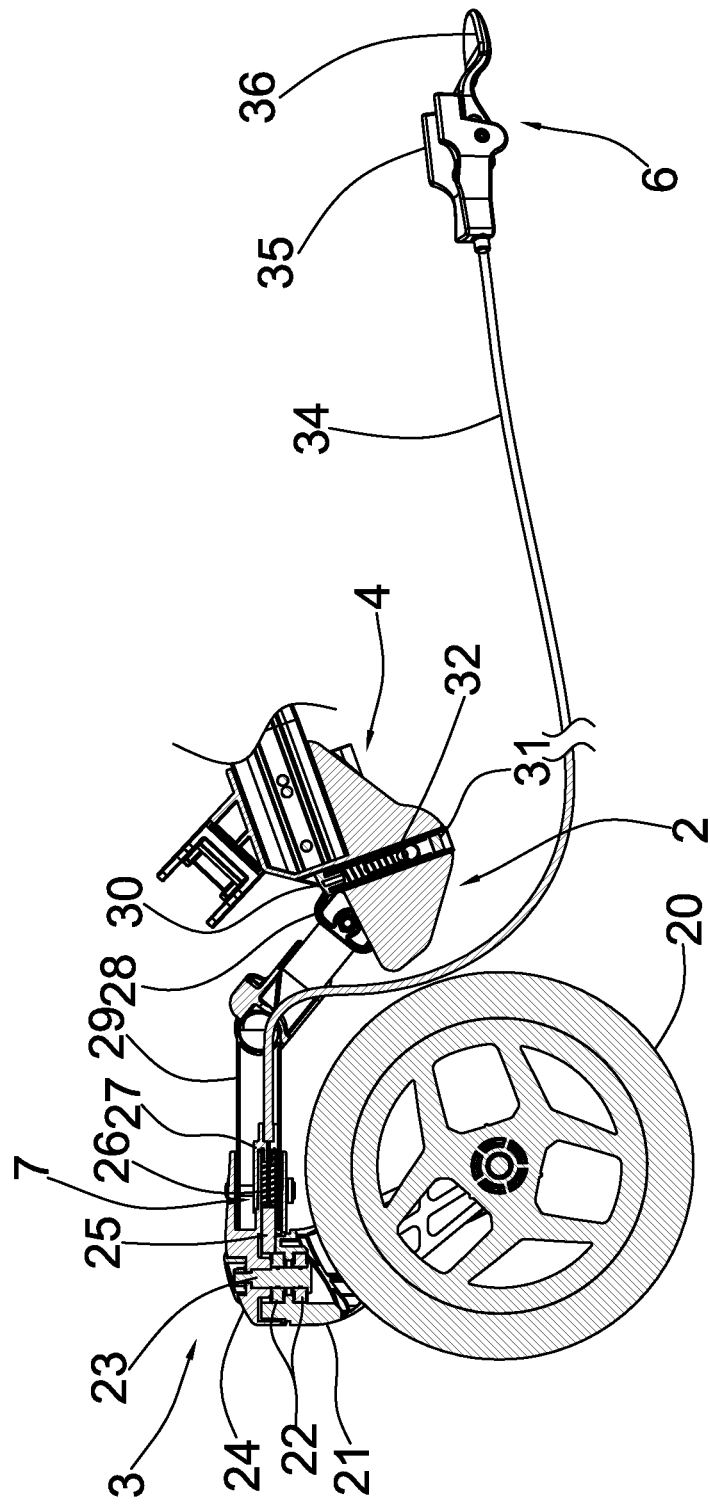
FIG. 7 is a schematic diagram of the golf bag cart according to the preferred embodiment of the present invention.

As shown in FIG. 6 of the drawings, the handle unit 6 comprises a handle base 35 and a handle member 36 operatively provided on the handle base 35. The handle member 36 may be driven to rotate with respect to the handle base 35 so as to drive a movement of the locking latch 25 via the connecting wire 34.

The locking mechanism 3 may be operated between a locking mode and an unlocking mode. In the locking mode, the handle member 36 of the handle unit 6 is rotated such that the resilient element 26 is released to bias against the locking latch 25 so as to drive the locking latch 25 to insert into a locking hole on the first connector 21 for locking the front wheel 20. A slight rotation of the front wheel 20 may also allow the locking latch 25 to engage with the locking hole of the first connector 21.

When the locking mechanism 3 is in the unlocking mode, the handle member 36 of the handle unit 6 is rotated such that the locking latch 25 is pulled by the connecting wire 34 to disengage from the locking hole of the first connector 21 while the resilient element 26 is re-compressed. At this time, the front wheel 20 is free to rotate and the golf bag cart is free to move forward or backward. From the above descriptions, one may appreciate that the front wheel of the golf bag cart may conveniently locked or unlocked without involving complicated equipment.

On the other hand, the folding mechanism 2 is mounted on the main frame 4, and comprises a sleeve structure 28 provided on the main frame 4, a support structure 29 connected to the sleeve structure 28, an actuating device 30 connected to the sleeve structure 28, and a control mechanism 32 which is provided in the actuating device 30, and comprise an engagement member 31 and a resilient assembly 32. The folding mechanism 2 may be operated between a folding mode and an unfolding mode. In the folding mode, the actuating device 30 is actuated in a predetermined manner to extend the resilient assembly 32 to push the engagement member 31 to disengage from the sleeve structure 28. At the same time, the support structure 29 may be collapsed to drive the front wheel 20 to fold toward the main frame 4. When the front wheel 20 is completely folded, the resilient assembly 32 is arranged to drive the engagement member 31 to re-engage with the sleeve structure 28, and the actuating device 30 is arrange to automatically restore to its original position.

When the folding mechanism 2 is in the unfolding mode, the actuating device 30 is actuated in a predetermined manner so as to extend the resilient assembly 32 for driving the engagement member 31 to disengage from the sleeve structure 28. The support structure 29 is arranged to drive the front wheel 20 to move apart from the rear wheels 10 so as to unfold the front wheel 20. When the front wheel 20 is completely unfolded, the resilient assembly 32 is arranged to drive the engagement member 31 to re-engage with the sleeve structure 28, and the actuating device 30 is arrange to automatically restore to its original position. From the foregoing descriptions, it can be appreciated that the golf bag cart of the present invention is facilitate easy and convenient folding and unfolding of the front wheel 20.

Referring to FIG. 1 to FIG. 5 of the drawings, the braking device 5 comprises a braking pedal 11 movably supported by the main frame 4, a braking member 12, a braking base 14 and a braking rim 13 attached on the corresponding rear wheel 10. The braking member 12 and the braking pedal 11 are supported by the braking base 14. The braking pedal 11 is arranged to drive the braking member 12 to selectively engage with and disengage from the braking rim 13 so as to selectively exert a braking force against the braking rim 13.

The operation of the braking device 5 is as follows: when a user of the present invention want to stop the golf bag cart, he or she may step on the braking pedal 11 which drives the braking member 12 to frictionally engage with a groove formed on the braking rim 13. When the user wishes to release the brake, he or she needs to slightly uplift the braking pedal 11 so as to drive the braking member 12 to disengage from the braking rim 13. From the foregoing descriptions, it can be appreciated that the golf bag cart of the present invention is facilitate easy and convenient braking of the golf bag cart.

The present invention, while illustrated and described in terms of a preferred embodiment and several alternatives, is not limited to the particular description contained in this specification. Additional alternative or equivalent components could also be used to practice the present invention.

What is claimed is:

1. A golf bag cart, comprising:
    a main frame having a main supporting portion, a handle portion upwardly extended from said main supporting portion, and a handle unit provided on said handle portion;
    a front wheel operatively supported by said main frame;
    two rear wheels operatively supported by said main frame; and
    a wheel folding arrangement which comprises a locking mechanism, said locking mechanism comprising a first connector connected to said front wheel, a second connector movably connected to said first connector via a bearing and a rotating axle, and a locking device provided on said first connector for selectively locking a relative movement between said first connector and said second connector, said locking device comprising a locking latch, and a resilient element provided on said locking latch and is normally compressed to exert a basing force against said locking latch,
    said locking mechanism being operated between a locking mode and an unlocking mode, wherein in said locking mode, said handle member of said handle unit is rotated such that said resilient element is released to bias against said locking latch so as to drive said locking latch to engage with said first connector for locking said front wheel, wherein in said unlocking mode, said handle member of said handle unit is rotated such that said locking latch is driven to disengage from said locking hole of said first connector while said resilient element is re-compressed so as to allow said front wheel to be freely rotatable.

2. The golf bag cart, as recited in claim 1, wherein said handle unit comprises a handle base and a handle member operatively provided on said handle base, said handle member being rotatable with respect to said handle base.

3. The golf bag cart, as recited in claim 1, wherein said wheel folding arrangement further comprises a folding mechanism which comprises a sleeve structure provided on said main frame, a support structure connected to said sleeve structure, an actuating device connected to said sleeve structure, and a control mechanism which is provided in said actuating device, and comprise an engagement member and a resilient assembly, said folding mechanism being operated between a folding mode and an unfolding mode, wherein in said folding mode, said actuating device is actuated to extend said resilient assembly to push said engagement member to disengage from said sleeve structure, said support structure being collapsed to drive said front wheel to fold toward said main frame in such a manner that when said front wheel is completely folded, said resilient assembly is arranged to drive said engagement member to re-engage with said sleeve structure, wherein in said unfolding mode, said actuating device is actuated to extend said resilient assembly for driving said engagement member to disengage from said sleeve structure, said support structure being arranged to drive said front wheel to move apart from said rear wheels so as to unfold said front wheel.

4. The golf bag cart, as recited in claim 2, wherein said locking device further comprises a connecting wire operatively connecting said locking latch and said handle unit of said main frame, such that said handle unit is arranged to drive said locking latch via said connecting wire.

5. The golf bag cart, as recited in claim 3, wherein said locking device further comprises a connecting wire operatively connecting said locking latch and said handle unit of said main frame, such that said handle unit is arranged to drive said locking latch via said connecting wire.

6. The golf bag cart, as recited in claim 4, further comprising a braking device mounted on at least one of said rear wheels, said braking device comprising a braking pedal movably supported by said main frame, a braking member, a braking base and a braking rim attached on said corresponding rear wheel, said braking member and said braking pedal being supported by said braking base, said braking pedal being arranged to drive said braking member to selectively engage with and disengage from said braking rim so as to selectively exert a braking force against said braking rim.

7. The golf bag cart, as recited in claim 5, further comprising a braking device mounted on at least one of said rear wheels, said braking device comprising a braking pedal movably supported by said main frame, a braking member, a braking base and a braking rim attached on said corresponding rear wheel, said braking member and said braking pedal being supported by said braking base, said braking pedal being arranged to drive said braking member to selectively engage with and disengage from said braking rim so as to selectively exert a braking force against said braking rim.

8. The golf bag cart, as recited in claim 6, wherein when said front wheel is completely folded, said resilient assembly is arranged to drive said engagement member to re-engage with said sleeve structure, and said actuating device is arrange to automatically restore to its original position.

9. The golf bag cart, as recited in claim 7, wherein when said front wheel is completely folded, said resilient assembly is arranged to drive said engagement member to re-engage with said sleeve structure, and said actuating device is arrange to automatically restore to its original position.

10. The golf bag cart, as recited in claim 8, wherein when said front wheel is completely unfolded, said resilient assembly is arranged to drive said engagement member to re-engage with said sleeve structure, and said actuating device is arrange to automatically restore to its original position.

11. The golf bag cart, as recited in claim 9, wherein when said front wheel is completely unfolded, said resilient assembly is arranged to drive said engagement member to re-engage with said sleeve structure, and said actuating device is arrange to automatically restore to its original position.

\* \* \* \* \*